United States Patent
Benedict et al.

(10) Patent No.: US 10,740,264 B1
(45) Date of Patent: Aug. 11, 2020

(54) DIFFERENTIAL SERIAL MEMORY INTERCONNECT

(71) Applicant: Hewlett Packard Enterprise Development LP, Houston, TX (US)

(72) Inventors: Melvin K. Benedict, Magnolia, TX (US); Reza Bacchus, Spring, TX (US); Mujeeb Rehman, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/397,050

(22) Filed: Apr. 29, 2019

(51) Int. Cl.
*G06F 13/16* (2006.01)
*G06F 3/06* (2006.01)
*G06F 13/42* (2006.01)

(52) U.S. Cl.
CPC ........ *G06F 13/1689* (2013.01); *G06F 3/0604* (2013.01); *G06F 3/0659* (2013.01); *G06F 3/0673* (2013.01); *G06F 13/4295* (2013.01)

(58) Field of Classification Search
None
See application file for complete search history.

(56) References Cited

U.S. PATENT DOCUMENTS

| | | | | |
|---|---|---|---|---|
| 7,263,013 B2* | 8/2007 | Kim | .......... | G11C 7/12 365/189.04 |
| 7,636,813 B2* | 12/2009 | Tremaine | ............ | G06F 13/1673 710/4 |
| 8,930,647 B1* | 1/2015 | Smith | ................. | G06F 9/44557 711/154 |
| 9,432,298 B1* | 8/2016 | Smith | ................. | H04L 49/9057 |
| 2008/0005518 A1* | 1/2008 | Gillingham | ......... | G06F 13/4243 711/167 |
| 2012/0311251 A1* | 12/2012 | Best | .................... | G06F 13/1689 711/105 |
| 2018/0130506 A1* | 5/2018 | Kang | .................... | G11C 16/10 |

* cited by examiner

*Primary Examiner* — Michael Sun
(74) *Attorney, Agent, or Firm* — Hewlett Packard Enterprise Patent Development

(57) ABSTRACT

A synchronous differential memory interconnect may include a bidirectional differential data signal bus, a unidirectional differential command and address bus, and a differential clock signal. Memory read and write data may be transmitted over the data signal bus in a serial fashion.

18 Claims, 5 Drawing Sheets

DIFFERENTIAL SERIAL MEMORY INTERCONNECT

BACKGROUND

Synchronous dynamic random-access memory (SDRAM) is a memory where the operation of its external in pin interface is coordinated by an externally supplied clock signal. Dynamic double data rate (DDR) SDRAM is a memory bus operating with DDR transfers of data on both the rising and falling edges of the clock signal. The Joint Electron Device Engineering Council (JEDEC) promulgates DDR SDRAM standards that are widely used in servers and personal computers today. For example, as of 2019, JEDEC has promulgated the DDR4 SDRAM standard.

For error correcting code (ECC) compatible memory, DDR4 defines a 72 bit parallel bidirectional single ended data bus. Each word transferred during a write or a read is 72 bits wide with 64 bits of data and 8 ECC bits, which is decoded by the memory controller into 64 bits of data. Typical memory modules include multiple ranks of 9 memory devices. A 72 bit transfer results in 8 bits read or written to each of the 9 devices. Burst reads are used to read an entire 64 byte cacheline of data through 8 sequential 8 byte reads.

BRIEF DESCRIPTION OF THE DRAWINGS

Certain examples are described in the following detailed description and in reference to the drawings, in which.

DETAILED DESCRIPTION OF SPECIFIC EXAMPLES

The disclosed technology provides a differential signaling interface for memory. Implementations may preserve the memory controller architecture of DDR SDRAM, with a memory controller integrated onto an system-on-chip (SoC) (e.g., a central processing unit (CPU)) and a memory module as a slave device on the memory bus. Use of a differential signaling interface may enable higher bus frequencies than the single-ended interfaces used in DDR4. Additionally, modulation techniques such as pulse amplitude modulation (PAM) enable additional bandwidth increases over non-return to zero (NRZ) encoding used in DDR protocols.

Figure 1:
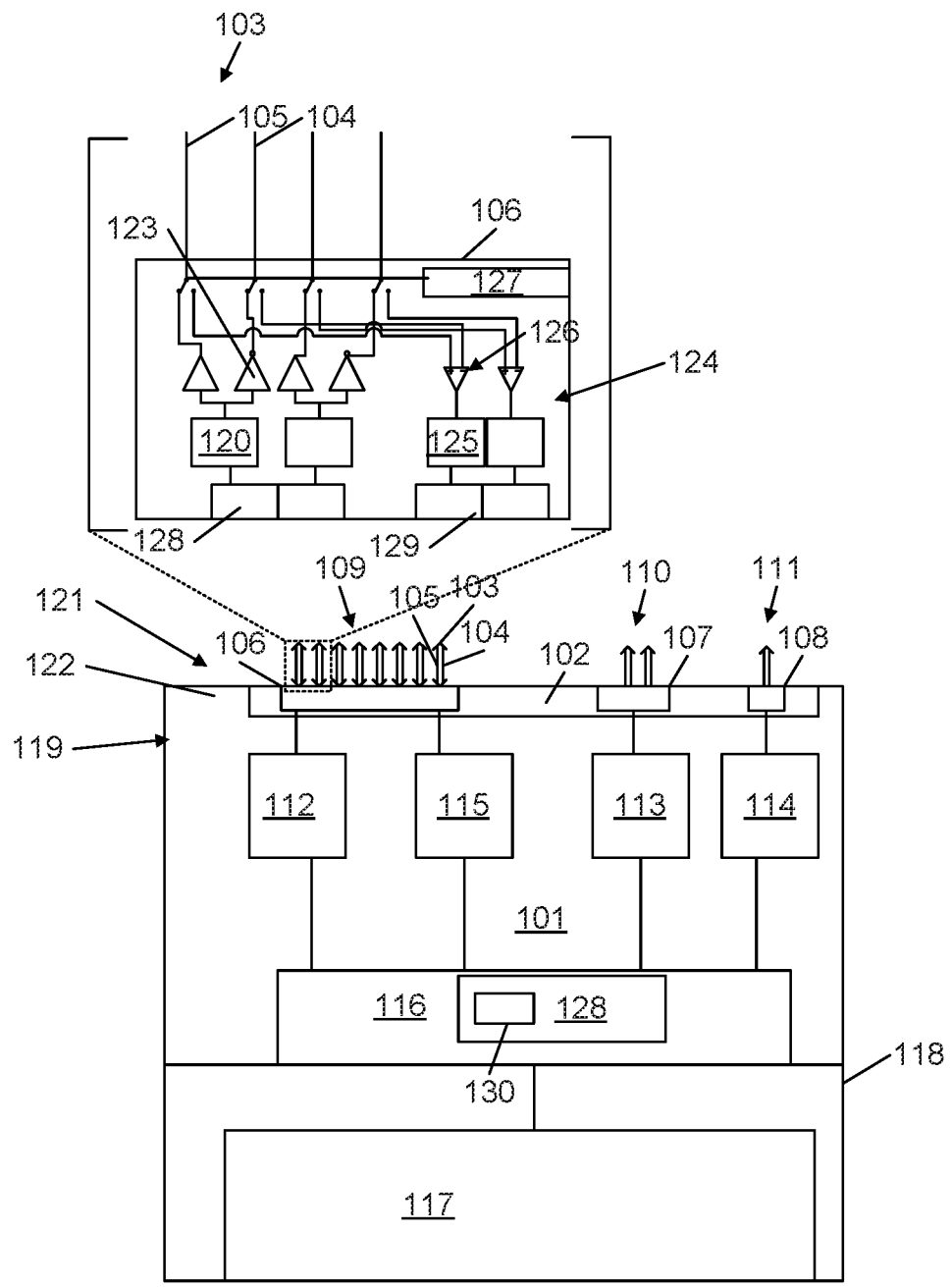
FIG. 1 illustrates an example memory controller including an interface to a bidirectional differential data bus and a unidirectional differential command and address bus.

FIG. 1 illustrates an example memory controller including an interface to a bidirectional differential data bus and a unidirectional differential command and address bus. In this example, the memory controller 101 is a memory controller for an SoC 118 that further includes other CPU circuitry 114, such as general purpose processing cores, on-die cache memories, accelerator circuitry such as embedded graphics processing units (GPUs) or transcoder circuitry, an on-die interconnect, or other hardware logic. As used herein, unless otherwise indicated logic, refers to circuitry configured to perform the described operation; software, firmware, or other code stored in a non-transitory readable medium and executable a hardware processor such as a microcontroller; or a combination thereof. In other implementations, the memory controller 101 may be integrated into various circuits, such as GPUs, field-programmable gate arrays (FPGAs), or other application specific integrated circuits (ASICs).

The memory controller 101 comprises a synchronous memory physical layer interface 102. The interface 102 comprises a plurality of traces 109, 110, 111. For example, the SoC 118 may be configured to be inserted into a socket and the traces may comprise pins to couple the interface 102 to traces disposed on a system main board (e.g., a motherboard). As another example, the SoC 118 may include copackaged memory such as on-package 3D stacked memory and the traces 109, 110, 111 may be permanent traces coupling the interface 102 to the memory disposed during the manufacturing process.

The interface 102 comprises a plurality 109 of differential bidirectional data signal trace pairs 103. In one example implementation, there are eight differential signals (i.e, 8 pairs 103). Each pair 103 of bidirectional data signal traces 109 comprises a pair of traces 105, 104 to carry a differential signal. The memory controller 101 uses the plurality 109 of differential bidirectional data signal traces 103 to transmit data to be written to memory over the bidirectional differential data bus. The memory controller 101 also uses the plurality 109 of differential bidirectional data signal traces 103 to receive data from memory over the bidirectional differential data bus.

The interface 102 further comprises input/output (I/O) circuitry 106. For example, the circuitry 106 may comprise transmitter circuitry 119 to modulate and transmit data over the traces 109. For example, the circuitry 119 may include a register 128 that includes cells to store the data to be sent over the traces 103 during a data transfer. For example, in a PAM4 modulation implementation, each cell may store 2 bits. The circuitry may further comprise a plurality of modulators 120 coupled to corresponding cells of the register. The modulator 120 may encode the data to be transferred over its corresponding trace pair 103 by applying a modulation technique such as pulse amplitude modulation (PAM) to the encoded symbols. For example, the circuitry 120 may apply a PAM4 modulation technique to the data. In a PAM4 modulation technique each of the four bit duples (i.e. 00, 01, 10, 11) are mapped to a different one of four different differential voltages carried over a trace pair 103 during a unit interval (UI). In other words, during each unit interval each pair 103 carries two bits. In other implementations, the circuitry 106 may apply other PAM modulation techniques, such as PAM8 or PAM16. The transmitter circuitry 119 may further include driver circuitry 121 to output the differential output signal onto the traces 103. For example, the circuitry 121 may include a plurality of amplifier 122, each coupled to a trace 105 and a plurality of inverting amplifiers 123, each coupled to a second trace 104 of the trace pairs 103.

The circuitry 106 may further comprise receiver circuitry 126 to receive and demodulate data received over the traces 109. For example, the receiver circuitry may comprise subtractors 126 coupled to each pair of traces 103 to receive a differential signal and output an output signal to a demodulator 125. For example, data may be received as PAM modulated signals of the same type used for data transmission. The circuitry 106 may include demodulator to decode the signals received on the differential trace pairs 103 and output them to a receiver register 129 to combine them to output a received symbol to a data decoder 115. The circuitry 106 may further comprise circuitry 127 to turn the bus around to switch from a transmit mode to transmit data on the plurality of bidirectional differential data signal trace pairs 109 and a receive mode to receive data on the plurality of bidirectional differential data signal trace pairs 109. Additionally, the circuitry 127 may apply stored link transmission and reception parameters to the circuitry 106 according to the current bus direction. For example, the link parameters may be obtained during link training which may occur at system boot and after a memory reset operation.

The interface 102 further comprises a plurality of unidirectional command and address signal differential trace pairs 110. Like the traces 109, each pair of traces 110 comprises a pair of traces to carry a differential signal. The memory controller 101 uses the traces 110 to transmit commands and address information to the memory. For example, preceding a data read, the memory controller 101 transmits a read command along with a read address via the traces 110. Similarly, preceding a data write, the memory controller 101 transmits a write command along with a write address via the traces 110. As another example, the controller 101 may use the traces 110 to transmit refresh commands to DRAM based memory modules. In some implementations, the traces 110 also carry chip select (CS) information. For example, the memory to which the controller 101 may be divided into a plurality of ranks with numerical identifiers. The CS information may be encoded and carried over the command and address traces 110. As described below, in some implementations it may be decoded by a reserializer on the memory module to activate a chip select line.

The interface further comprises I/O circuitry 107. For example, the circuitry 107 may comprise transmitter circuitry to modulate and transmit data over the traces 109. The transmitter circuitry may be as described with respect to circuitry 106 and may include registers, modulators, and other physical signal output circuitry. In some implementations, the circuitry 107 may modulate the data using the same modulation scheme as the circuitry 106 uses to modulate the data transmitted over the pairs 103. In other implementations, the circuitry 107 may modulate the command and address information using a different scheme. For example, the circuitry 106 might modulate the data using PAM8, while the circuitry 107 modulates the command and address information using PAM4 or NRZ modulation.

The memory controller 101 further comprises a data encoder 112. The data encoder 112 receives and serializes a unit of write data into a first plurality of serially encoded symbols. For example, the data encoder 112 may receive an 80 byte sequence from the memory controller front end circuitry 116. The encoder 112 may encode the bits to be transmitted using a scrambling code to provide sufficient transition density to keep the transmitter and receiver pairs of the memory controller 101 and memory module in lock. For example, the encoder 112 may apply an 8b/10b encoding scheme on the 80 byte sequence to produce 800 output bits to be transmitted over the differential data bus 109. The data encoder 112 may buffer the encoded bit sequence and break the sequence into serialized bit sequences corresponding to the width of the bus 109 (i.e., the number data trace pairs 103) and the number of bits transmitted per UI. For example, in an implementation with 8 trace pairs 109 and PAM4 modulation, the memory controller 101 may transmit 16 bits per UI and the encoder 112 may place 2 bits per register cell into register 128 for 50 UIs (e.g., 32 data bits plus 8 ECC bits and a burst length of 16, giving a data field of 640 bits. With 8b10b encoding, this results in 800 bits being serialized onto the 8 signal interface. With PAM 4 modulation, 2 bits are transferred per signal line per UI, resulting in 50 UIs for a data transfer in this example).

The memory controller 101 further comprises a data decoder 115. The data decoder 115 decodes a unit of read data from a plurality of serial bit sequences received over the data traces 109. For example, the received data may be encoded with a scrambling code (such as an 8b/10b code) and the decoder 115 may decode received bit sequence to produce a unit of read data. The decoder 115 may then return the read data to the front end circuitry 116 for transmission to the requesting circuitry 117.

The memory controller 101 further comprises a command and address encoder 113. The encoder 113 receives from the front end circuitry 116 and serializes a memory command. If the memory command involves a memory address, such as a read command or a write command, the encoder 113 further receives and serializes the memory address. In some implementations, the encoder 113 further receives and serializes chip select information. In some implementations, the encoder 113 applies a scrambling code to introduce sufficient transitions in the signals sent over the unidirectional command address traces 110 to allow the receiver on the connected memory module(s) to stay in lock with the transmitter 107. In some implementations, the encoder 113 applies the same scrambling codes as the encoder 112. For example, the encoder 113 may apply an 8b/10b code to the command and address bits received from the front end circuitry 116. The size of the serialized bit sequences sent to the transmitter may be configured according to the number of differential trace pairs 110 and the modulation applied to the bit sequence. For example, in an implementation with two trace pairs 110 and PAM 4 modulation, 4 bits of data or address information may be transmitted per UI. As an example, the encoder 113 may provide 32 bits of 8b/10b command information (including 29 bits encoding the command to be executed and 3 bits of chip select information) to be over the traces 110 in 8 UIs. In this example, the encoder 113 may transmit 64 bits of address information in 20 UIs. In further implementations, the encoder 113 may serialize further information into the command and address transmission. For example, in an implementation supporting media that has a non-deterministic read and write times (such as certain types of non-volatile media), the command and address information may include a transaction ID used to match a command to information returned by the memory module.

In the illustrated example, the interface 102 further comprises a reference clock signal differential trace pair 111. The traces 111 carry a differential clock signal used by the memory controller 101 and the memory module(s) coupled to the memory channel for synchronous data transfer. In various implementations, the clock frequency may be between 14.9 Ghz and 15.1 Ghz. In some implementations, the clock frequency is between 14 and 15 GHz, for example, 14.4 GHz. The clock signal may be transmitted on the traces 111 by transmitter circuitry 108 based on a clock signal generated by clock generator 114. The memory controller 101 further comprises clock generator circuitry 114. The clock generator circuitry 114 generates the clock signal to be transmitted over traces 111 by transmitter circuitry 108, as discussed above. In some implementations, the clock generator 114 may further provide a clock signal to the encoders 112 and 113 and the decoder 115. In other implementations, that circuitry may operate on a different clock domain than the channel clock.

In other examples, the interface 102 does not include a separate reference clock signal. Instead, the reference clock signal may be transmitted on the command and address differential traces 110. As discussed above, the command and address signal lines are unidirectional, and do not turn around. Accordingly, the reference clock signal may be transmitted over one or more of the trace pairs 110 without disruption. When a command or address signal is transmitted over the traces 110, the clock signal may be recovered from the scrambling encoding applied to the transmitted information. When a command or address signal is not being transmitted, the clock signal may be transmitted directly as a clock pulse signal or as an encoded idle bit sequence.

The memory controller 101 further comprises front end circuitry 116. The front end circuitry 116 provides an interface to the rest of the SoC circuitry 117—for example, through an on-chip interconnected. The circuitry 116 may perform various memory controller functions, such as prioritization of various read and write requests, to provide and receive symbols to the encoders 112, 113, and decoder 115.

The circuitry 116 may include scheduling circuitry 128 that performs scheduling functions to schedule command and address transmissions, data transmissions and receptions, and operations to turn the bus 109 around from the transmit mode to the receive mode. In this implementation, the scheduling circuitry 128 includes bus master logic 130 to switch the memory controller between a transmit mode to transmit data on the plurality of bidirectional differential data signal trace pairs and a receive mode to receive data on the plurality of bidirectional differential data signal trace pairs. For example, the bus master logic 130 may signal the circuitry 127 to turn the bus around and apply the corresponding link parameters to the circuitry 106. In some implementations, the logic 130 may send a bus turnaround command to the command encoder 113 for transmission to the memory module over the traces 110. In other implementations, a specific bus turnaround command is not sent to the memory controller, and the memory controller automatically enters a receive or transmission mode according to the preceding received write or read command.

Figures 2A, 2B:
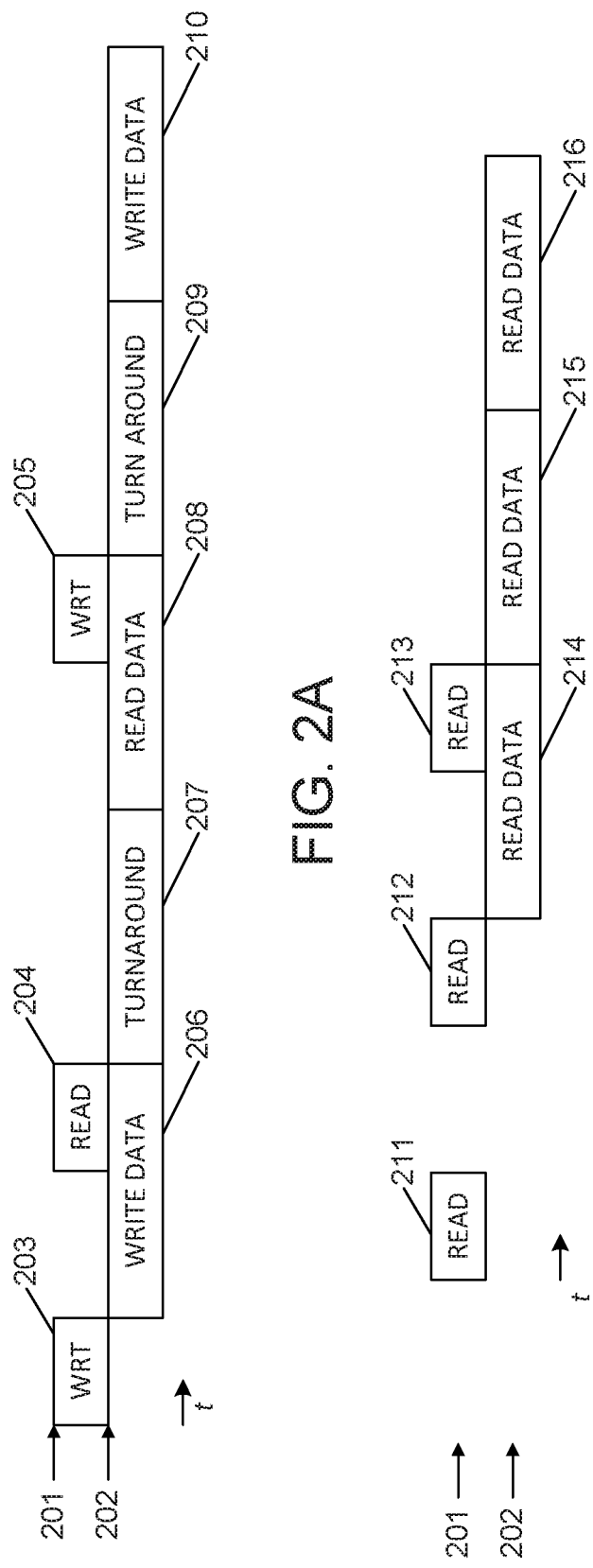
FIG. 2A illustrates an example of transaction scheduling for altering read and write commands in one implementation.
FIG. 2B illustrates an example of a bursted read operation.

FIG. 2A illustrates an example of transaction scheduling for alternating read and write commands in one implementation. In FIG. 2A, command, address and chip select information transmissions are illustrated in line 201 while data is illustrated in line 202. The illustrated example begins with the memory controller transmitting write command (including chip-select and address information) 203 to write data to a first address on a first memory rank over the unidirectional differential command and address bus. After the write command completes, the memory controller transmits the write data 206 over the bidirectional data bus.

The memory controller transmits the read command (including chip-select and address information) 204 over the differential command and address bus while the write data 206 is being transmitted over the bidirectional data bus. For example, the memory controller may transmit the read command 204 so that the read command completes before the write data 206 completes or coincidently with the write data 206 completing.

After the write data transmission 206 completes, the logic 130 turns the data bus around at the memory controller side to prepare to receive data in response to the read command 204. In some implementations, the memory module may perform a bus turnaround operation automatically because of the received read command 204 following the write command 203. In other implementations, the read command 204 may include a bus turnaround command or a bus turnaround command may be transmitted following or preceding the read command 204.

The transmit-to-receive time required to switch from the transmit mode to the receive mode is less than or equal to a column access strobe (CAS) latency time for a connected memory module. Accordingly, the turnaround time 207 overlaps with the CAS latency time that the memory module requires before being able to read data after receiving a write data. Accordingly, by parallelizing the bus turnaround 207 with the CAS latency, the architecture avoids additional write-to-read latency that would be introduced by serializing the command and address information with the write data.

In response to the read command 204, the memory controller receives read data 208 read from the address in the read command. The memory controller transmits the following write command 205 (including address and chip select information) during the reception of the read data 208. For example, the memory controller may transmit the second write command 205 so that the write command completes before or coincidently with the read data 208 transmission completing. After the read data 208 completes, the memory controller turns the bus around 209 to switch from the receive mode to the transmit mode. In this implementation, the receive-to-transmit time required to switch from the receive mode to the transmit mode is less than a time required by a compatible dynamic random access (DRAM) memory module to prepare to receive data. For example, less than the time required to close the open row that was read from and to prepare to receive data into a DRAM row buffer. Accordingly, the data bus turnaround time 209 overlaps with the DRAM turnaround time, which avoids additional read-to-write latency that would be introduced by serializing the command and address information with the read data.

FIG. 2B illustrates an example of a burst read operation. In the burst read operation, each read command reads from the currently open row. The operation begins with a first read command 211, which includes chip select and address information. After a certain amount of time the memory module returns the first read data 214. For example, the memory module may return the first read data 214 after a predefined time to permit the memory module to open the row from which the data will be read. Before the first read data 214 begins to be transmitted, the memory controller transmits the second read command 212 to enable the second read data 215 to be transmitted immediately after the first read data 214 completes. Similarly, the third read command 213 is transmitted before the second read data 215 begins to be transmitted to enable the third read data 216 to be transmitted immediately after the second read data 215 completes. Read commands may continue to be pipelined in such a manner to allow as much of the open row to be read out as required.

Figure 3:
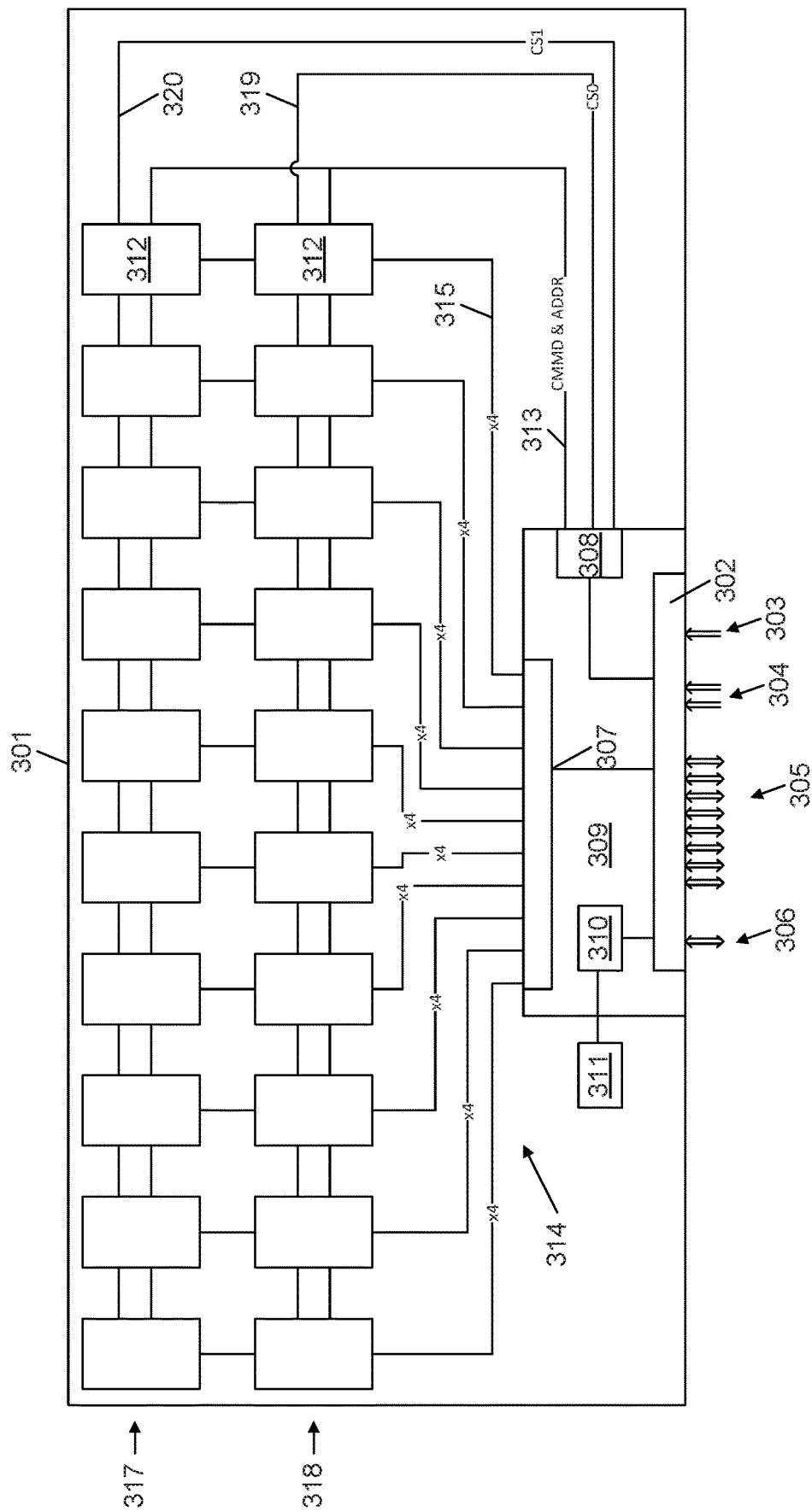
FIG. 3 illustrates an example memory module configured to be coupled to a memory controller over a differential signal bus.

FIG. 3 illustrates an example memory module 301 configured to be coupled to a memory controller over a differential signal bus. For example, the memory module 301 may be a dual inline memory module (DIMM) or a 3D stacked on-SoC memory module. As an example, the memory controller may be as described with respect to FIGS. 1 and 2. In this example, the memory module 301 includes two ranks 317, 318 of dram chips 312, with each rank have a 40 bit wide data bus 314 (32 bits of data and 8 bits of ecc data). This data bus 314 may be a singled ended bus. In this example, there are 10 DRAM chips 312 in each rank 317, 318 connected to 4 parallel signal lines 315. However, other implementations may utilize other DRAM chip layouts (such as an x8 layout, or a layout without ECC). In other examples, the module 301 may be a non-volatile memory module or a non-volatile backed DRAM module.

This example memory module 301 includes redriver 309, which may be implemented as circuitry or other hardware logic. The redriver 309 receives serially encoded data and commands and converts the received signals to be provided to the memory devices 312. Additionally, the redriver 309 receives read data from the memory devices 312 and serializes the data to be returned to the memory controller.

The redriver 309 includes a synchronous memory physical layer interface 302. The interface 302 includes a plurality of bidirectional differential data signal trace pairs 305. In one example implementation, there are eight differential signals (i.e, 8 pairs 305). Each pair of bidirectional data signal traces 305 comprises a pair of traces to carry a differential signal. The memory module 301 uses the plurality 305 of differential bidirectional data signal traces to receive data to be written to the memory devices 312 over the bidirectional differential data bus. The redriver 309 also uses the plurality 305 of differential bidirectional data signal traces to transmit read data to the memory controller over the bidirectional differential data bus.

The interface 302 may further include circuitry to demodulate signals received over the bus 305 and to modulate signals to be transmitted over the bus 305. For example, as described above, data may be transmitted over the traces 305 using PAM, such as PAM4. The interface 302 may further include circuitry to decode the received data and to encode the data to be transmitted. For example, the circuitry may be configured to encode the data to be transmitted using a scrambling code providing sufficient transitions for locking between the module 301 and the memory controller. For example, the circuitry may encode the bit stream to be transmitted using an 8b/10b encoding scheme, and may decode a received bit stream using 10b/8b decoding.

The interface 302 includes a plurality of unidirectional command and address signal differential trace pairs. The interface 302 may further include circuitry to demodulate and decode the command and address signals received over the traces 304. In this example, the interface 302 further includes a pair 303 of traces for a differential reference clock signal. The interface 302 may use the clock signal to synchronize the bus and coordinate the transfers over the traces 305, 304. In another example, the interface 302 does not include a separate differential reference clock signal. Rather, interface 302 may recover the clock from one or more of the address and command differential trace pairs 304. While command and address information is being received over the pairs 304, the clock may be recovered due to the scrambling code applied to the command and address information. During idle periods, the memory controller may transmit an idle bit stream on the command and address bus to the traces 304, which when encoded with the scrambling code allows the interface 302 to perform clock recovery.

The interface 302 may further include circuitry to perform a bus turnaround operation. The bus turnaround operation may be performed similarly as described with respect to the memory controller's bus turnaround operation. For example, the bus turnaround circuitry may cause the data receiver circuitry or the data transmission circuitry to be coupled to the traces 305 and may cause receive-mode or transmit mode link parameters to be loaded.

The redriver 309 further includes a data serializer/deserializer (SERDES) coupled to the plurality 305 of bidirectional differential data signal trace pairs and to the plurality of memory devices 312. During a write operation, the SERDES deserializes the write data received over the traces 305 into bus-width sized bit sequences, which are then transferred to the selected memory devices 312. For example, in a DRAM architecture with a 40 bit wide bus 314 (i.e., there are 40 bits per transfer over the bus 315) with a burst length of 16 (for a total of 80 bytes per write operation), the SERDES 307 may buffer 40 bits at a time. Once 40 bits are received, the SERDES 307 transfers the 40 bits over the bus 314 and buffers the next 40 bits. During a read operation, the SERDES serializes the data received during each data transfer over the bus 314 for the read burst length (e.g. 40 bits per transfer for 16 transfers in an x4 DRAM architecture) and provides the serialized bit stream to the interface 302 for transmission over the traces 305. For example, the SERDES 307 may apply 8b/10b encoded and output 16 bits at a time to the interface 302 for transmission of 2 bits per trace on eight traces 305.

The redriver 309 further comprises a command and address decoder 308 coupled to the plurality of unidirectional command and address signal trace pairs 304 and to the plurality of memory devices 312. The decoder 308 deserializes the received command and address information and transmits it over an internal command and address bus 313 to the memory devices 312. In some implementations, the internal command and address bus 313 is a single ended bus. In the illustrated example, chip select information is carried over the command and address bus through the traces 304. For example, the chip select information may comprise a sequence of bits identifying the memory rank 317, 318 to which the data will be written or read from. For example, 3 bits allows the memory channel to support 8 different memory ranks. The decoder 308 activates the chip select line 319, 230 corresponding to the selected memory rank. For example, if the current command is to read data at an address on rank 318, the decoder 308 activates chip select line 319. In some implementations, if the selected memory rank is not on the memory module 301 (i.e., it is on a different memory module 301), the decoder 308 may cause the redriver 309 to ignore the current memory command.

This example redriver 309 also includes a plurality of management bus traces 306. For example, the traces 306 may be a pair of traces to carrier a differential management bus signal. For example, the management bus may be an I3C bus or other management and sensor bus to which the traces 306 provide an interface. The redriver 309 further comprises management logic 310 which may be used to configure redriver 309 configuration parameters. For example, the logic 310 may be a microcontroller executing management firmware. The logic 310 may be coupled to a memory module storage 311, such as a read-only memory (ROM). For example, the ROM may be used to store serial presence detect (SPD) information as well as link parameters generated during a preceding link training operation occurring at system boot or after a memory reset operation.

Figure 4:
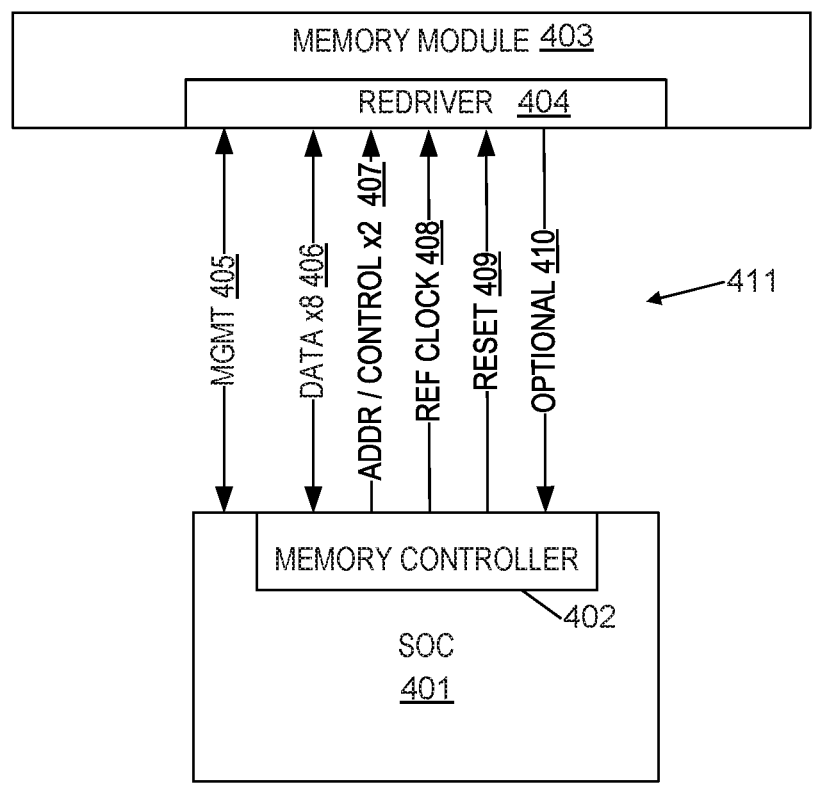
FIG. 4 illustrates an example system including an SoC and a memory module.

FIG. 4 illustrates an example system including an SoC 401 and a memory module 403. For example, the SoC 401 may be implemented as described with respect to FIG. 1 and the memory module 403 may be implemented as described with respect to FIG. 3. In this example, the memory controller 402 is connected to the redriver 404 via a memory interface 411. As described above, the memory interface 411 includes a plurality of birdirectional differential data signal lines 406, a plurality of unidirectional address and control differential lines 407, a unidirectional differential reference clock signal line 408, and a management bus interface 405. In other examples, the reference clock differential line 408 may be omitted and the clock may be sent over one or more of the control and address lines 407, as described above.

In this example, the interface 411 further comprises a reset signal 409. For example, the reset signal line 409 may be a unidirectional single ended line. For example, the memory controller 402 may drive the signal low on the line to cause the memory module 403 to reset itself. As described above, after a memory reset, the memory controller 402 and redriver 404 may perform a link training operation to generate data transmit and receive parameters, as well as command and address link parameters. In an alternative implementation, the interface 411 does not include a reset signal. Rather, the memory controller may transmit a reset command over the command and address bus to trigger a reset. For example, the memory controller may transmit a unique bit sequence indicating a reset followed by a cessation of data transmission for a certain period of time (e.g., n microseconds) following by a training sequence that would reset the memory module.

In this example, the interface 411 further comprises an optional differential signal line 410. For example, the optional line 410 may be used by supporting memory modules to carry in or out of bound information back to the memory controller 402 in addition to the data carried on bus 406 and management information carried on bus 405. For example, the optional line 410 may be used by a nonvolatile memory module 403 to return a transaction identifier (ID) corresponding to the data being returned. In this example, each read command transmitted over the bus 407 includes a transaction identifier. By including the transaction ID on the line 410, the interface 411 may support non deterministic responses from the memory module 403. In additional implementations, the interface 411 may include additional differential or single ended lines. For example, additional lines may be used to support implementer-specific memory configurations.

Figure 5:
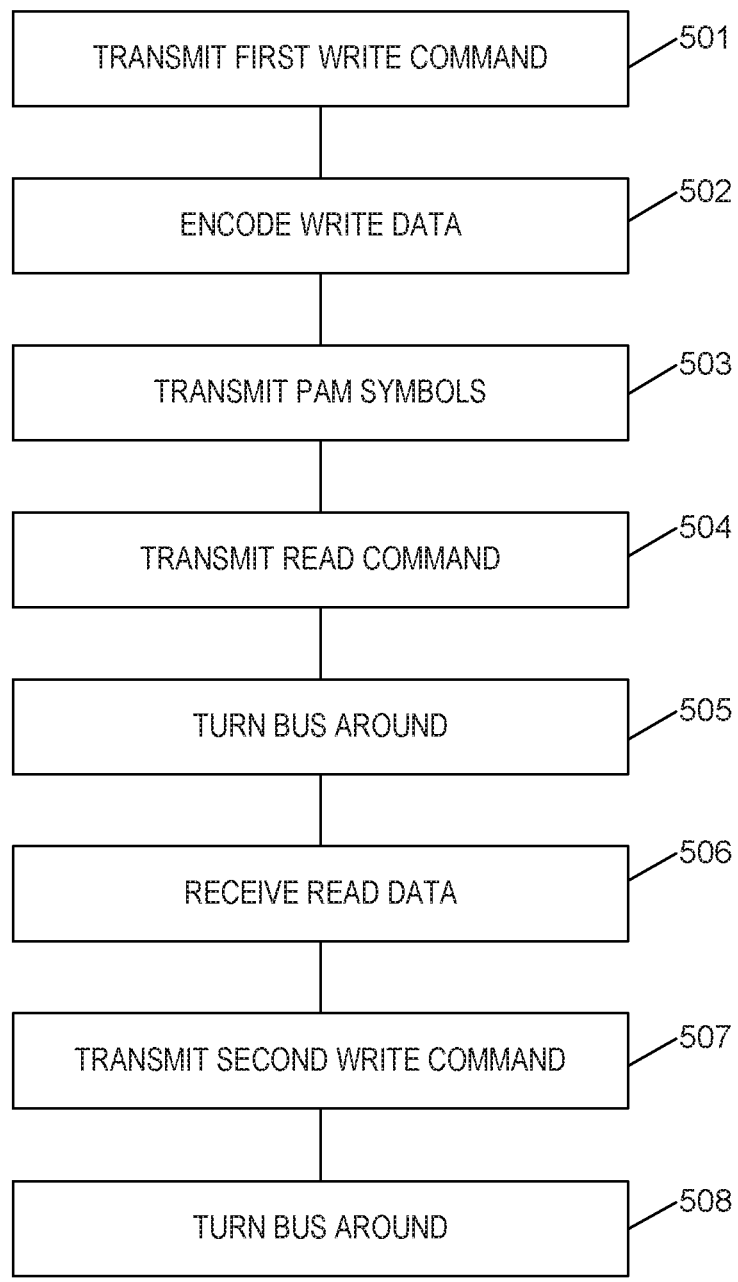
FIG. 5 illustrates an example method of transmitting commands and data over a differential signaling interface between a memory controller and a memory module.

FIG. 5 illustrates an example method of transmitting commands and data over a differential signaling interface between a memory controller and a memory module. For example, the example memory controllers described above may operate as described with respect to FIG. 5.

The method includes block 501. Block 501 includes transmitting a write command over a unidirectional differential command and address bus. For example, the write command may be encoded using a scrambling code, such as 8b/10b and modulating using a PAM modulation scheme, such as a PAM4 modulation scheme. As described above, block 501 may further include transmitting a write address and a chip select ID over the unidirectional differential command and address bus. For example, block 501 may be performed as described with respect to FIG. 2A.

The method includes block 502. Block 502 includes modulating a memory write data transfer as a first plurality of pulse amplitude modulated (PAM) symbols. For example, as described above, the write data may be modulated using PAM4, PAM8, PAM16 or higher modulations. In some implementations, block 501 includes encoding the write data prior to modulating the data. For example, the encoding may be performed using a scrambling code such as 8b/10b encoding, as described above. The method further includes block 503. Block 503 includes transmitting the plurality of PAM symbols over a bidirectional differential data bus.

The method further includes block 504. Block 504 may include transmitting a read command over the unidirectional differential command and address bus while transmitting the first plurality of PAM symbols over the bidirectional differential data bus. For example, block 504 may be performed as described with respect to the transmission of the read command 204 during the transmission of the write data 206 in FIG. 2A.

The method further includes block 505. Block 505 may include turning the bidirectional differential data bus around during a column access strobe latency time following an end of the read command. For example, block 505 may be performed by the memory controller as described with bus turnaround operation 207 of FIG. 2A.

The method further includes block 506. Block 506 includes receiving a memory read data transfer as a second plurality of PAM symbols over the bidirectional differential data bus. For example, the memory controller may perform block 506 as described with respect to receiving read data 208 of FIG. 2A.

The method may further include block 507. Block 507 includes transmitting a second write command over the unidirectional differential command and address bus while receiving the second plurality of PAM symbols. For example, block 507 may be performed by the memory controller as described with respect to the second write command 205 of FIG. 2A.

The method may further include block 508. Block 508 includes turning the bidirectional differential data bus around during a memory device turnaround time following an end of the write command. For example, block 508 may be performed as described with respect to the bus turnaround operation 210.

The method may continue as described above, for example, as described with respect to FIGS. 2A and 2B.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A memory controller, comprising:
 a synchronous memory physical layer interface comprising:
  a plurality of bidirectional data signal differential trace pairs; and
  a plurality of unidirectional command and address signal differential trace pairs;
 a data encoder to encode a unit of write data into a first plurality of serially encoded symbols;
 a data transmitter to transmit the encoded symbols over the plurality of bidirectional differential data signal trace pairs;
 a command encoder to encode a write command and a write address into a second plurality of serially encoded symbols;
 a command and address transmitter to transmit the encoded write command and address over the plurality of unidirectional command and address signal trace pairs;
 a data receiver to receive a plurality of serially encoded symbols; and
 a data decoder to decode the symbols into a decoded read data; wherein:
 a transmit-to-receive time required to switch from the transmit mode to the receive mode is less than or equal to a column access strobe latency.

2. The memory controller of claim 1, further comprising:
bus master logic to switch the memory controller from a transmit mode to transmit data on the plurality of bidirectional differential data signal trace pairs and a receive mode to receive data on the plurality of bidirectional differential data signal trace pairs.

3. The memory controller of claim 1, wherein:
a receive-to-transmit time required to switch from the receive mode to the transmit mode is less than a time required by a compatible dynamic random access (DRAM) memory module to switch from a DRAM receive mode to a DRAM transmit mode.

4. The memory controller of claim 1, wherein the synchronous memory physical layer interface further comprises a single ended reset signal trace.

5. The memory controller of claim 1, wherein the synchronous memory physical layer interface further comprises an optional media support differential signal trace.

6. The memory controller of claim 1, wherein the synchronous memory physical layer interface further comprises a serial sensor bus trace.

7. The memory controller of claim 1, wherein the data encoder is to apply a pulse amplitude modulation (PAM) technique to modulate the write data.

8. The memory controller of claim 1, wherein the synchronous memory physical layer interface further comprises a reference clock signal differential trace pair.

9. The memory controller of claim 7, wherein the data encoder is to apply a scrambling encoding process to the data.

10. The memory controller of claim 9, wherein the scrambling encoding process utilizes an 8b/10b code.

11. The memory controller of claim 1, wherein the command transmitter is to encode a chip select signal into the second plurality of serially encoded symbols.

12. A memory module, comprising:
a synchronous memory physical layer interface comprising:
a plurality of bidirectional data signal differential trace pairs; and
a plurality of unidirectional command and address signal differential trace pairs; and
a reserializer coupled to the plurality of bidirectional differential data signal trace pairs and to a plurality of memory devices; and
a deserializer coupled to the plurality of unidirectional command and address signal trace pairs and to the plurality of memory devices;
wherein the deserializer is to decode a chip select signal from symbols received over the plurality of unidirectional command and address signal trace pairs.

13. The memory module of claim 12, wherein the synchronous memory physical layer interface further comprises a plurality of management bus trace pairs.

14. The memory module of claim 12, wherein the reserializer is coupled to the plurality of memory devices via a single ended data bus.

15. The memory module of claim 12, wherein the synchronous memory physical layer interface comprises a reference clock signal differential trace pair.

16. A method, comprising:
transmitting a write command over a unidirectional differential command and address bus;
encoding a memory write data transfer into a first plurality of pulse amplitude modulated (PAM) symbols;
transmitting the plurality of PAM symbols over a bidirectional differential data bus;
transmitting a read command over the unidirectional differential command and address bus while transmitting the first plurality of PAM symbols over the bidirectional differential data bus;
turning the bidirectional differential data bus around during a column access strobe latency time following an end of the read command; and
receive a memory read transfer as a second plurality of PAM symbols over the bidirectional differential data bus.

17. The method of claim 16, further comprising:
encoding a chip select signal into the first plurality of PAM symbols.

18. The method of claim 17, further comprising:
transmitting a second write command over the unidirectional differential command and address bus while receiving the second plurality of PAM symbols; and
turning the bidirectional differential data bus around during a memory device turnaround time following an end of the write command.

\* \* \* \* \*